March 13, 1928. 1,662,292
R. C. BENDER
COMBINATION VEHICLE AND WALKER
Filed Jan. 21, 1926 3 Sheets-Sheet 1
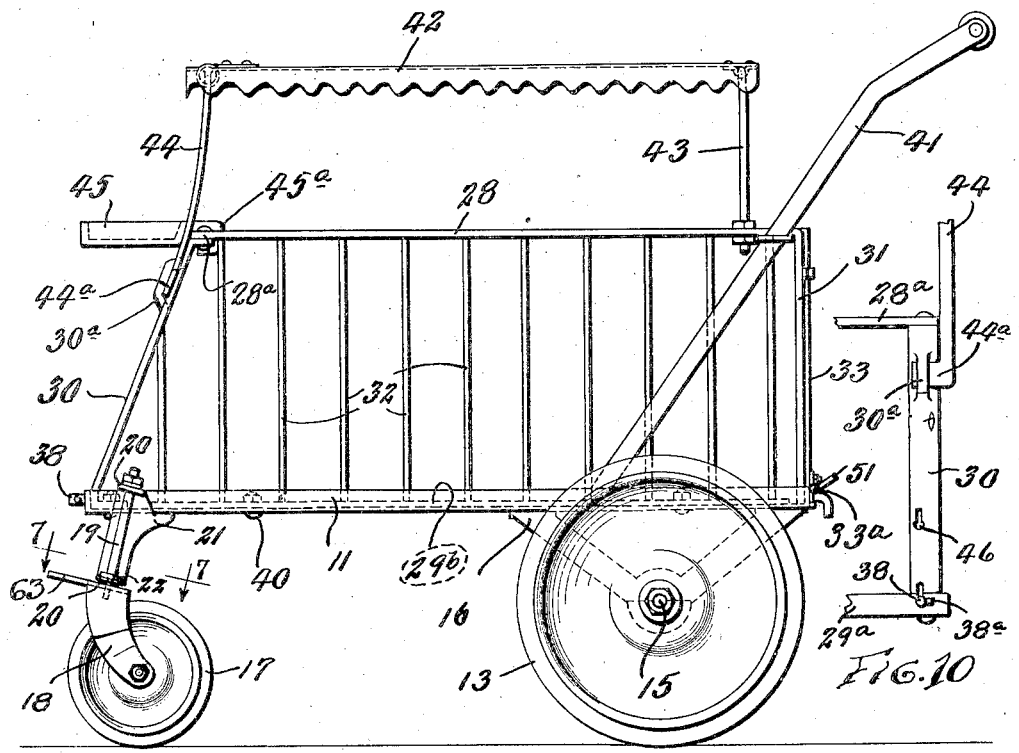
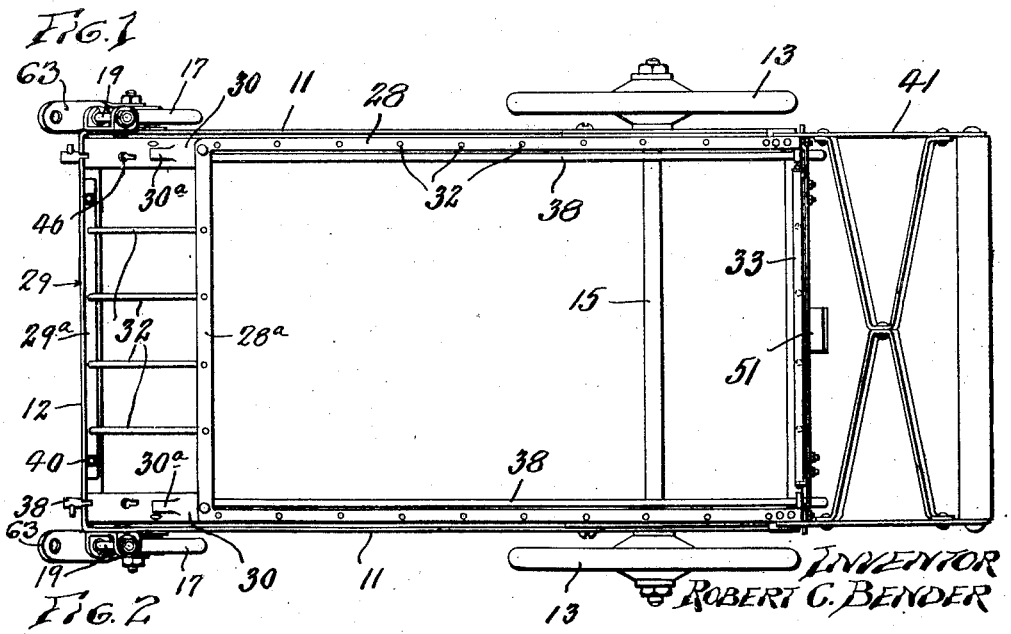
INVENTOR
ROBERT C. BENDER
By Cornwall, Birdell & Janus
ATTYS.

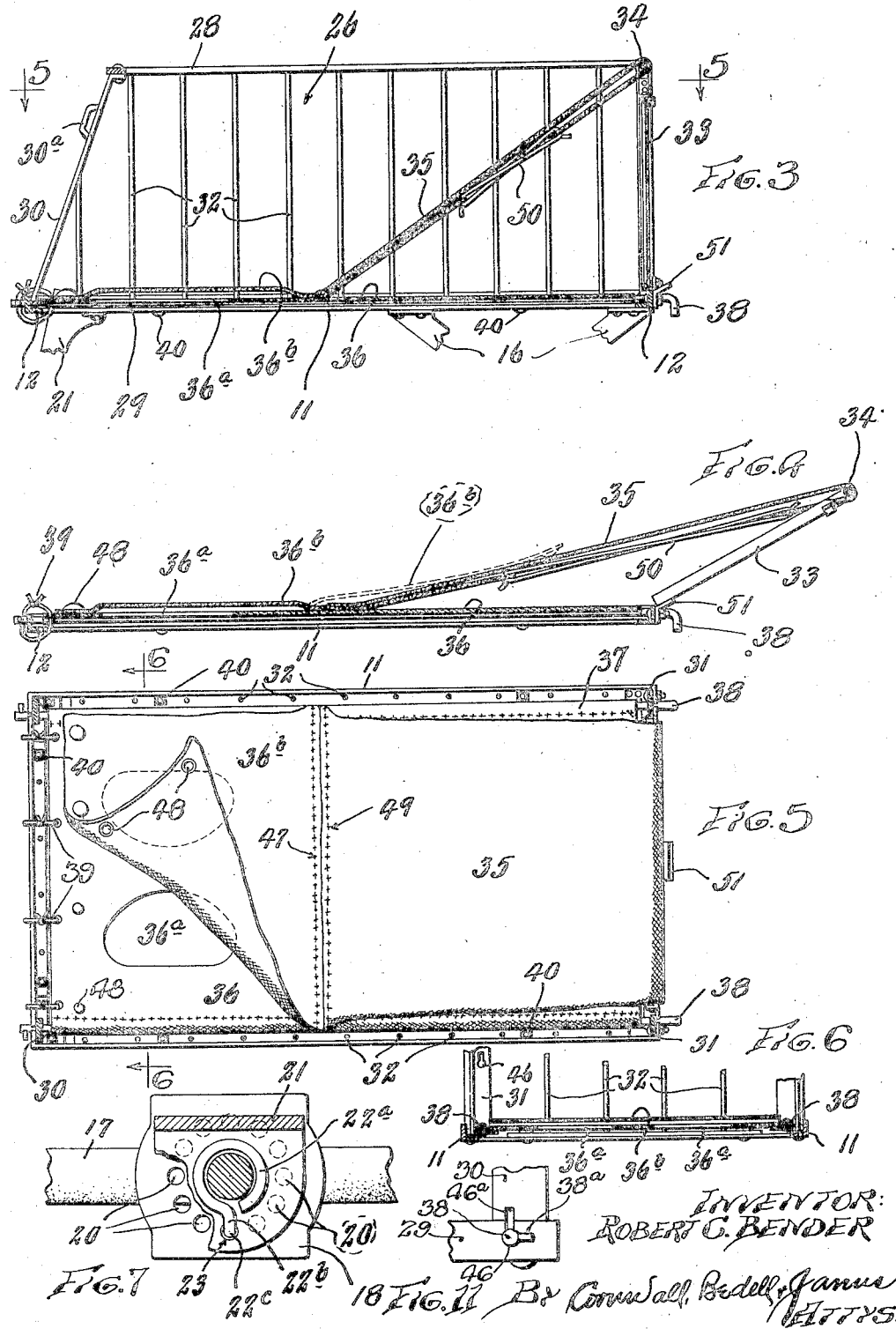

March 13, 1928.

R. C. BENDER 1,662,292

COMBINATION VEHICLE AND WALKER

Filed Jan. 21, 1926

INVENTOR:
ROBERT C. BENDER

By Cornwall, Bedell & Janney
ATTYS.

Patented Mar. 13, 1928.

1,662,292

UNITED STATES PATENT OFFICE.

ROBERT C. BENDER, OF ST. LOUIS, MISSOURI.

COMBINATION VEHICLE AND WALKER.

Application filed January 21, 1926. Serial No. 82,712.

The invention relates to new and useful improvements in children's vehicles and walkers, the object of the invention being to provide a vehicle adapted to be converted into a walker, a go-cart, or a coaster.

Further objects of the invention are to provide a go-cart having a detachable canvas bottom provided with suitable leg openings whereby said vehicle can be used as a walker.

Still other objects of the invention are to provide a wheeled vehicle frame adapted to interchangeably receive a go-cart body and a rigid platform, whereby said vehicle may be used either as a go-cart or coaster.

Other objects of the invention are to provide detachable steering mechanism to be used when the vehicle is converted into a coaster and to provide a detachable handle designed for use when the vehicle is converted into a go-cart.

Additional objects of the invention are to provide an awning detachably secured to the body of the go-cart.

With these and other objects in view, my invention consists in certain novel features of construction and arrangement of parts, hereinafter more fully described and claimed, and illustrated in the accompanying drawings, in which—

Figure 1 is a side elevational view of the vehicle converted into a go-cart.

Figure 2 is a top plan view of the same with certain parts thereof removed to more fully illustrate the invention.

Figure 3 is a longitudinal cross section taken vertically through the vehicle with parts thereof broken away.

Figure 4 is a similar view but showing the rear wall of the go-cart moved into an extended position.

Figure 5 is a horizontal cross section taken on line 5—5 of Figure 3.

Figure 6 is a transverse vertical cross section taken on line 6—6 of Figure 5.

Figure 7 is a detail sectional view taken on line 7—7 of Figure 1.

Figure 10 is a detail view showing in front elevation one of the front frame members of the go-cart body.

Figure 11 is a detail view of the go-cart frame showing the bottom rod supported thereon.

Figure 8:
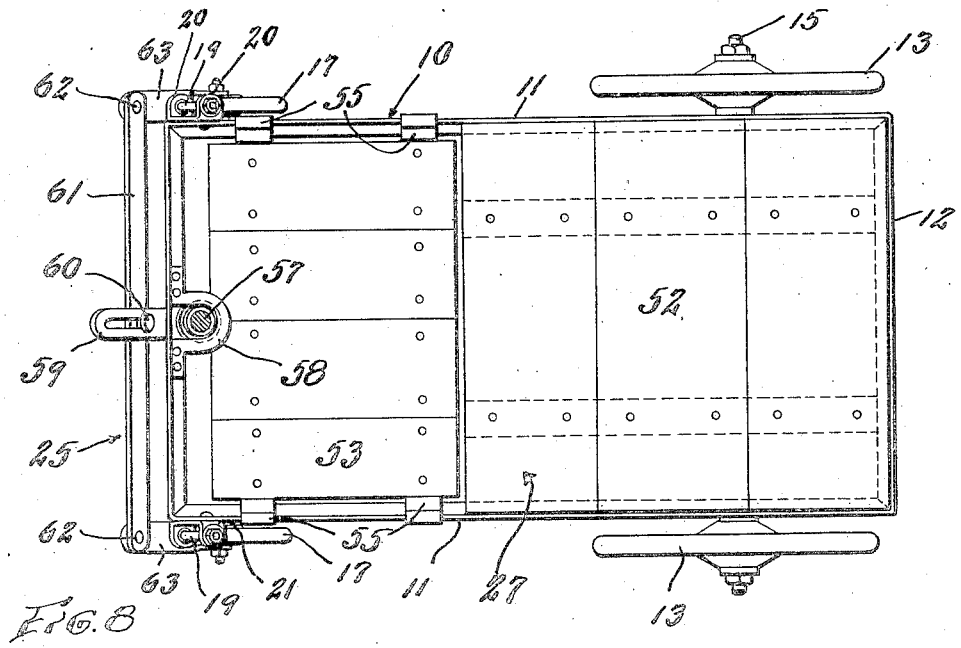
Figure 8 is a top plan view of the vehicle showing the latter converted into a coaster.

Referring by numerals to the accompanying drawings, 10 indicates a main supporting frame of the vehicle, said frame comprising side members 11 and end members 12, preferably formed of angle iron. This frame is provided with rear wheels 13 carried by a rear axle 15 which is mounted in bearing brackets 16. The front wheels 17 are journaled in separate supports or brackets 18 which have upwardly extending pins or pintles 19 rotatably mounted in bearings 20, the latter being formed in brackets 21. Thus the front wheels are free to move about the axes of pintles 19 and the vehicle can be easily steered.

A locking member 22 is provided for each front wheel whereby the latter can be locked in the desired position relative to the axle. This locking member consists of a loop or circular portion 22$^a$ which encircles each pintle 19 and has an outwardly presented extension 22$^b$, the end of which is bent downwardly as at 22$^c$ and enters an aperture 23 formed in the lower bearing 20. This portion 22$^c$ projects past said bearing and engages one of a series of apertures 24 which latter are arranged concentrically in the adjoining face of support 18. By bringing pin 22$^c$ in the proper aperture 24, the front wheel can be locked at any required angle relative to the longitudinal axis of the vehicle.

Figure 9:
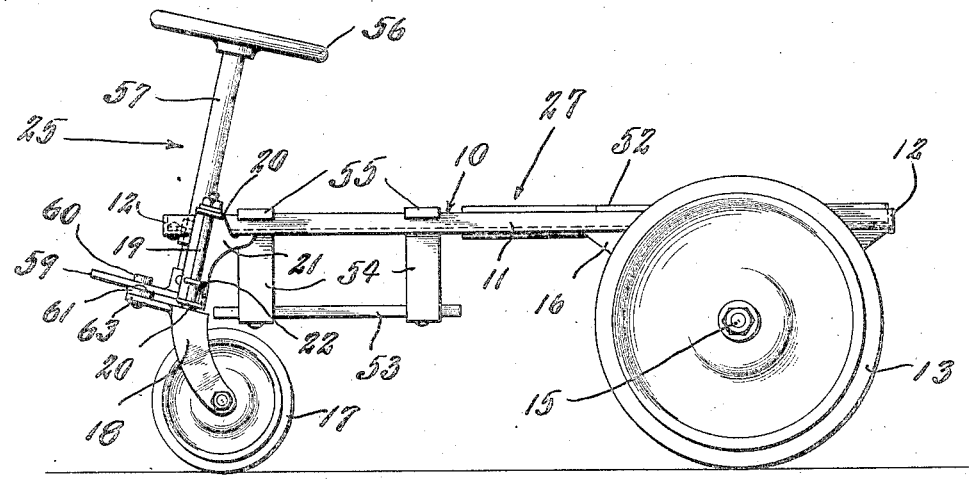
Figure 9 is a side elevational view of same.

When it is desired to have the front wheels free, as when steering mechanism 25 is used, member 22 is lifted out of engagement with aperture 23 and is partially turned to move pin 22$^c$ away from said aperture. The construction just described provides a wheeled support for a go-cart body 26, as shown in Figure 3, or a rigid platform construction 27 such as shown in Figures 8 and 9, when it is desired to use the vehicle as a coaster or wagon.

The go-cart body comprises rectangular top and bottom frame members 28 and 29, respectively, connected together at the front end by posts 30 and at the rear end by posts 31. The front and sides of the go-cart body are formed by a series of vertically disposed rods 32 spaced a suitable distance from each other and having their ends seated in frame members 28 and 29. The rear wall 33 is hingedly connected at 33ª to the lower frame member 29 and is provided at the upper end with a horizontally disposed rod 34 for engaging an upwardly and rearwardly inclined canvas extension 35 of a canvas member 36 which forms the bottom of the go-cart body. The side edges of this canvas member are looped to provide longitudinally disposed pockets 37 for receiving supporting rods 38 which latter are removably seated in end posts 30 and 31 and hold said bottom piece in position. The front edge of the bottom member 36 can be tied or otherwise secured to the horizontally disposed front end member 29ª of frame 29, as indicated at 39 in order to prevent displacement of said bottom member. The go-cart body 26 is secured to frame 10 by suitable fastening devices 40 which engage the side members 29ᵇ of frame 29 and side members 11 of main frame 10.

A handle 41 is removably attached to go-cart body 26 and extends rearwardly therefrom as shown in Figures 1 and 2. An awning 42 is removably supported on the go-cart body 26 by rods 43 which are attached to frame 28 near the rear ends thereof. The front end of the awning is supported by members 44, the lower ends of which are bent laterally as at 44ª and are seated in recesses formed by forcing outwardly portions 30ª of posts 30. A tray 45 has extensions 45ª which fit over the front end of frame member 28ª and removably support the tray in position.

The bottom supporting rods 38 are seated in apertures 46 formed in uprights 30 and 31 and are locked against withdrawal by lateral projections 38ª formed on the forward ends of said rods. Each aperture 46 is provided with a vertically disposed notch 46ª and when it is desired to remove rods 38 from position, said rods are given a quarter turn to bring projections 38ª in alignment with notches 46ª whereby said rods can be withdrawn.

There are two or more sets of apertures 46, as shown in Figure 4, each set being spaced from the other in vertical plane and by placing rods in the proper set of apertures 46, bottom 36 can be raised or lowered as desired. The forward end of bottom 36 is provided with openings 36ª which are adapted to receive the legs of a child when it is desired to use the vehicle as a walker.

A flap 36ᵇ is secured to member 36 at 47 and is adapted to be placed over the forward portion of member 36 and cover said openings 36ª when it is not desired to use the vehicle as a walker, there being suitable fasteners 48 provided to button the flap against the bottom member 36 or against extension 35. This extension is secured to the bottom member at 49 and passes over the rod 34 and can be drawn tightly in position by means of lacing 50, thereby serving to hold hinged rear wall 33 in closed position, as shown in Figure 3. In this position, extension 35 acts as a back rest.

When it is desired to use the go-cart as a bed, lacing 50 is released, thereby permitting wall 33 to be lowered into the position shown in Figure 4, in which position said wall rests against a projection 51 which projection is fixed to the lower frame member 29. When in this position, extension 35 can be drawn taut by tightening lacing 50.

When it is desired to use the vehicle as a coaster or wagon, go-cart body 26 is removed by removing fastening devices 40 and a rigid platform 52 is placed in frame 10 as shown in Figures 8 and 9. If desired, the forward portion of the platform can be lowered as indicated at 53 to form a foot-rest and said portion 53 is supported on frame 10 by bars 54 which extend upwardly and have their ends hooked over the upper edges of side members 11 as indicated at 55.

The steering mechanism is designed to be preferably used with the vehicle when converted into a wagon or coaster, but may also be used in combination with a go-cart body. This steering mechanism comprises a steering wheel 56 carried by a steering column 57, which latter is supported in bearing 58 attached to the front end member 12. The lower end of steering column 57 has fixed thereto a forwardly projecting arm 59 which is slotted to receive a pin 60 of a transverse rod 61. The ends of this rod are pivotally connected at 62 to arms 63 which extend from each bracket 18. By turning steering wheel 56 in the proper direction, bar 61 is moved correspondingly through its slot and pin connection with the steering column and actuates brackets 18 to position wheels 17 at the proper angle. However, to use the steering mechanism, it is first necessary to raise locking members 22 and move them in displaced position.

The steering mechanism 25 may be readily removed from the vehicle when desired. The front wheels 17 may be left unlocked to turn freely on pivots 19, or they may be locked by means of members 22 in any desired position.

The rods 38 supporting bottom 36 can be inserted in the higher series of apertures 46, whereby bottom 36 can be raised in the go-cart body. By making the different attachments as separate units, they can be bought separately and added to the vehicle as needed.

While I have shown and described the preferred forms of my improved vehicle, it is obvious that various changes in the construction of the vehicle can be made and substituted for those herein shown and described, without departing from the spirit of my invention.

I claim:

1. A child's vehicle comprising in combination a wheeled frame, a go-cart body detachably arranged thereon, said go-cart body being provided with a rear end portion pivotally mounted at its lower end and tiltable outwardly, a pair of longitudinally disposed rods removably arranged in the go-cart body one adjacent to each side thereof, a canvas bottom arranged in said go-cart body and provided along its side edges with loops for supporting engagement with said rods and a flap secured at one end to said canvas bottom intermediate the ends thereof and normally foldable thereagainst, the outer end of said flap being adapted to be detachably secured to said rear end portion of said go-cart body whereby said flap can be adjusted angularly relatively to said canvas body.

2. In a child's vehicle, the combination with a wheeled supporting frame, of a go-cart frame removably attachable to said supporting frame, means for securing said go-cart frame to said supporting frame, longitudinal side rods detachably arranged in the end uprights of said go-cart frame, a canvas bottom for said go-cart frame and provided with looped portions for removably receiving said side rods, and an extensible flap attached to said canvas bottom and engaging the upper edge of the rear wall of said go-cart body, said rear wall being tiltable to adjust said flap angularly relatively to said canvas bottom, said rear wall being held in tilted position by said flap.

3. In a child's vehicle, the combination with a wheeled supporting frame, of a go-cart body provided with a tiltable back wall, said go-cart body being adapted to be removably secured to said supporting frame, a canvas bottom removably supported by said go-cart body, an extensible flap secured to said canvas bottom and extending upwardly and rearwardly and looped over the upper edge of said tiltable back wall, and a lacing for drawing said extensible flap taut.

4. A child's vehicle, comprising in combination a wheeled frame, a go-cart body detachably arranged thereon, a longitudinally disposed rod removably arranged in each side of said go-cart body, a canvas bottom provided in its sides with longitudinally disposed pockets for removably receiving said rods, means for tying the ends of said canvas bottom to the ends of said go-cart body, said bottom being provided with leg openings whereby said vehicle can be used as a walker, and a bottom extension secured to said bottom and movable in position to cover said leg openings.

In testimony whereof I hereunto affix my signature this 16th day of January, 1926.

ROBERT C. BENDER.